March 15, 1927.
J. A. KINDLE
CHECK PROTECTOR
Filed April 3, 1926
1,621,416
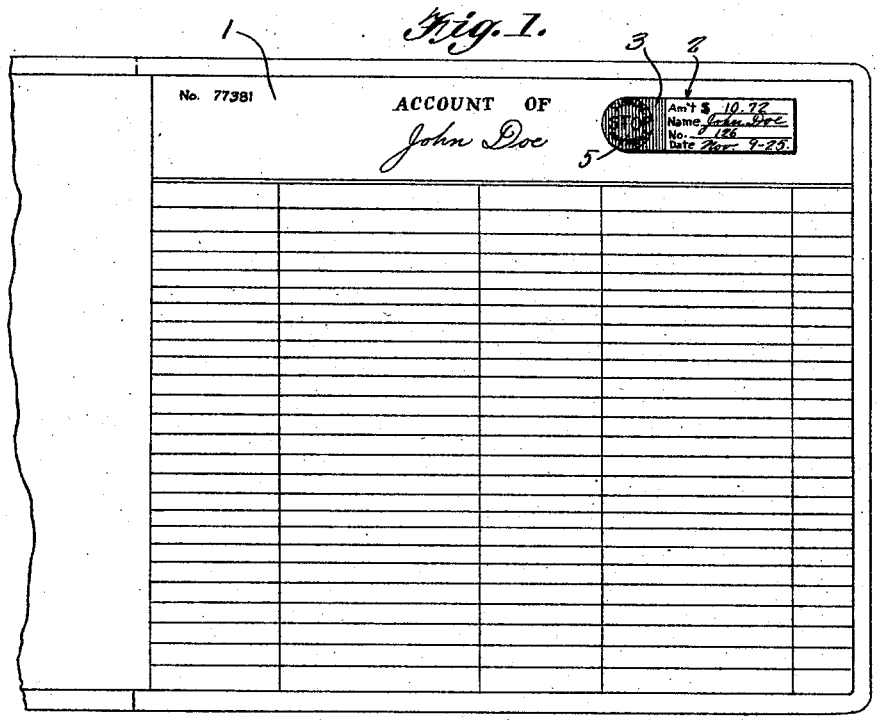
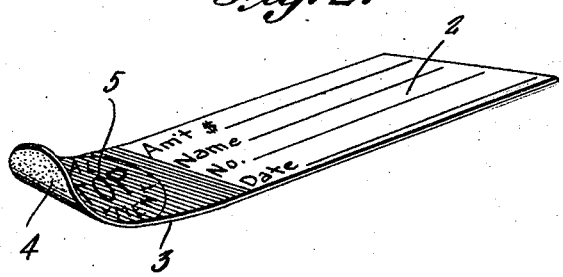
John A. Kindle,
INVENTOR
BY Victor J. Evans
ATTORNEY
WITNESS:

Patented Mar. 15, 1927.

1,621,416

UNITED STATES PATENT OFFICE.

JOHN ACLE KINDLE, OF MONROE, WASHINGTON.

CHECK PROTECTOR.

Application filed April 3, 1926. Serial No. 99,611.

The object of this invention is the provision of simple means designed to be adhesively secured on a ledger sheet in a bank, which has characteristics different from that of a sheet, so that the same will be readily observed, wherein such means is provided with spaces for data relative to a check which has been issued but upon which the bank has been notified to stop payment thereon.

The drawings which accompany and form part of this application illustrate a satisfactory embodiment of my improvement and wherein—

Figure 1 is a face view of a ledger sheet employed in banks showing my improvement attached thereon.

Figure 2 is a perspective view of the improvement.

Banks frequently receive orders to stop payments on checks drawn by their depositors. Ordinarily the ledger sheet in the bank is simply marked with the instructions regarding the non-payment of a certain check, but these markings are not at all times distinct and have frequently been overlooked so that the check has been cashed regardless of the request of the depositor. It is my intention to provide a simple means in the nature of a signal to stop payment on checks of this character by the use of which time wasted in comparing checks with the original stop payment order issued by the person who wishes the payments stopped will be effectively overcome.

In the drawings a ledger sheet or card usually employed in banks and especially by the cashier thereof, is indicated by the numeral 1. Each of these sheets bears the account of a depositor in the bank and when an order is issued to stop payment upon a certain check a notice to this effect is pasted on the sheet. This notice if merely a written notation as previously stated, is frequently overlooked. With my improvement it will be noted, as the description progresses, that an inspection of the sheet without going into the minor details contained thereon will immediately notify the teller that a payment upon a certain check on the said account is not to be made.

My improvement consists of a tab or sticker 2. The tab is ruled and has inscribed thereon data relative to the amount for which a check upon which payment is to be stopped, has been drawn, together with the name of the depositor, the number of the check and the date of said check. One end of the tab 2, designated for distinction by the numeral 3, is colored differently from the body of the tab. The coloring is preferably a vivid red, as indicated by the numeral 5, so that the tab cannot fail but attract the attention of the teller when the said tab is adhesively secured on the poster card or sheet at the position illustrated in Figure 1. The end 3 of the tab 2 has its outer end rounded and on its colored face is inscribed with a circle in which is printed the warning signal "stop payment". The inner or non-colored face of the tab is treated with an adhesive 4.

The simplicity of my construction and the advantages thereof will be perfectly apparent to those skilled in the art to which such invention relates when the foregoing description has been read in connection with the accompanying drawings.

Having described the invention, I claim:—

1. A signal stop payment device to be used on a ledger sheet in banks, comprising a tab bearing appropriately designated spaces for the insertion of data relative to a check upon which payment is to be refused, and the said tab being provided with means whereby it may be fixedly secured to the leaf.

2. A signal stop payment device to be used on a ledger sheet in banks comprising a tab bearing appropriately designated spaces for the insertion of data relative to a check upon which payment is to be refused, the said tab being provided with means whereby it may be fixedly secured to the leaf and said tab having a rounded end which is differently colored from that of the body of the tab.

3. A signal stop payment device to be used on a ledger sheet in banks comprising a tab bearing appropriately designated spaces for the insertion of data relative to a check upon which payment is to be refused, the said tab provided with means whereby it may be fixedly secured to the leaf, said tab having its outer face of different colors and having a warning signal inscribed on its said outer face.

In testimony whereof I affix my signature.

JOHN ACLE KINDLE.